US012668530B2

(12) United States Patent
Sugimoto et al.

(10) Patent No.: US 12,668,530 B2
(45) Date of Patent: Jun. 30, 2026

(54) GLASS CERAMIC AND LAMINATED CERAMIC ELECTRONIC COMPONENT

(71) Applicant: Murata Manufacturing Co., Ltd., Nagaokakyo (JP)

(72) Inventors: Yasutaka Sugimoto, Nagaokakyo (JP); Taichi Watanabe, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 774 days.

(21) Appl. No.: 18/065,980

(22) Filed: Dec. 14, 2022

(65) Prior Publication Data

US 2023/0117436 A1 Apr. 20, 2023

Related U.S. Application Data

(63) Continuation of application No. PCT/JP2021/022434, filed on Jun. 14, 2021.

(30) Foreign Application Priority Data

Jun. 17, 2020 (JP) ................................. 2020-104657
Jun. 17, 2020 (JP) ................................. 2020-104658
(Continued)

(51) Int. Cl.
*C03C 14/00* (2006.01)
*B32B 27/36* (2006.01)
(Continued)

(52) U.S. Cl.
CPC ............ *C03C 14/004* (2013.01); *B32B 27/36* (2013.01); *C03C 3/066* (2013.01); *C03C 3/093* (2013.01);
(Continued)

(58) Field of Classification Search
CPC ..... C03C 3/066; C03C 3/093; C03C 10/0009; H01G 4/30; C04B 35/14; C04B 35/18
See application file for complete search history.

(56) References Cited

U.S. PATENT DOCUMENTS 4,312,951 A 1/1982 Eppler
4,624,934 A 11/1986 Kokubu et al.
(Continued)

FOREIGN PATENT DOCUMENTS

EP 2824089 A1 1/2015
JP 860235744 A 11/1985
(Continued)

OTHER PUBLICATIONS

International Search Report in PCT/JP2021/022433, mailed Aug. 24, 2021, 3 pages.
(Continued)

*Primary Examiner* — Cameron K Miller
(74) *Attorney, Agent, or Firm* — ArentFox Schiff LLP

(57) ABSTRACT

A glass ceramic that contains a glass containing Si, B, Al, and Zn and aggregates. The glass has a $SiO_2$ content of 20% by weight to 55% by weight, a $B_2O_3$ content of 15% by weight to 30% by weight, $Al_2O_3$, and ZnO, wherein a weight ratio of the $SiO_2$ to the $B_2O_3$ ($SiO_2/B_2O_3$) is 1.21 or higher, and a weight ratio of the $Al_2O_3$ to the ZnO ($Al_2O_3/ZnO$) is 0.8 to 1.3. A $TiO_2$ content, a $ZrO_2$ content, a $SnO_2$ content, and a SrO content in the glass each are 0% by weight to 5% by weight. The aggregates include 20% by weight to 50% by weight of $SiO_2$, 1% by weight to 10% by weight of $TiO_2$, 3% by weight or less of $ZrO_2$, and 1% by weight or less of ZnO each relative to the weight of the glass ceramic.

6 Claims, 1 Drawing Sheet

(30) Foreign Application Priority Data

| | | | |
|---|---|---|---|
| Nov. 19, 2020 | (JP) | ................................ | 2020-192650 |
| Nov. 19, 2020 | (JP) | ................................ | 2020-192651 |

(51) Int. Cl.

| | |
|---|---|
| *C03C 3/066* | (2006.01) |
| *C03C 3/093* | (2006.01) |
| *H01B 3/12* | (2006.01) |
| *H01G 4/12* | (2006.01) |
| *B32B 27/08* | (2006.01) |
| *H01G 4/30* | (2006.01) |

(52) U.S. Cl.

CPC .............. *H01B 3/12* (2013.01); *H01G 4/129* (2013.01); *B32B 27/08* (2013.01); *B32B 2250/244* (2013.01); *B32B 2255/10* (2013.01); *B32B 2307/202* (2013.01); *B32B 2307/7246* (2013.01); *B32B 2307/734* (2013.01); *B32B 2457/00* (2013.01); *C03C 2214/04* (2013.01); *C03C 2214/30* (2013.01); *H01G 4/30* (2013.01)

(56) References Cited

U.S. PATENT DOCUMENTS

| | | | |
|---|---|---|---|
| 7,351,674 | B2 | 4/2008 | Mori et al. |
| 9,190,211 | B2 | 11/2015 | Fujita et al. |
| 9,214,259 | B2 | 12/2015 | Adachi et al. |
| 2003/0228968 | A1 | 12/2003 | Usui et al. |
| 2004/0198579 | A1 | 10/2004 | Horsfall et al. |
| 2005/0037911 | A1 | 2/2005 | Fechner et al. |
| 2005/0065014 | A1 | 3/2005 | Narita et al. |
| 2005/0151116 | A1 | 7/2005 | Fechner et al. |
| 2006/0052231 | A1 | 3/2006 | Ito et al. |
| 2007/0213195 | A1 | 9/2007 | Hikata et al. |
| 2007/0237935 | A1 | 10/2007 | Mori et al. |
| 2008/0053592 | A1* | 3/2008 | Khadilkar .......... C04B 35/6264 |
| | | | 156/89.18 |
| 2011/0223399 | A1 | 9/2011 | Adachi et al. |
| 2014/0066283 | A1 | 3/2014 | Kaneko et al. |
| 2014/0117294 | A1 | 5/2014 | Kass |
| 2014/0153262 | A1 | 6/2014 | Ohta et al. |
| 2014/0206522 | A1 | 7/2014 | Yano et al. |
| 2014/0347782 | A1 | 11/2014 | Fujita et al. |
| 2016/0122231 | A1 | 5/2016 | Ishihara et al. |
| 2016/0244356 | A1 | 8/2016 | Lecomte et al. |
| 2018/0127305 | A1 | 5/2018 | Li |
| 2019/0322567 | A1 | 10/2019 | Kawata et al. |

FOREIGN PATENT DOCUMENTS

| | | | |
|---|---|---|---|
| JP | H04198041 | A | 7/1992 |
| JP | H05201746 | A | 8/1993 |
| JP | H06199541 | A | 7/1994 |
| JP | H07135379 | A | 5/1995 |
| JP | H07237933 | A | 9/1995 |
| JP | 2004026529 | A | 1/2004 |
| JP | 2007145688 | A | 6/2007 |
| JP | 2009274902 | A | 11/2009 |
| JP | 2010006690 | A | 1/2010 |
| JP | 2010531287 | A | 9/2010 |
| JP | 2016128361 | A | 7/2016 |
| WO | 2010058697 | A1 | 5/2010 |
| WO | 2013021921 | A1 | 2/2013 |
| WO | 2013121929 | A1 | 8/2013 |
| WO | 2014038230 | A1 | 3/2014 |

OTHER PUBLICATIONS

International Search Report in PCT/JP2021/022434, mailed Aug. 24, 2021, 4 pages.

\* cited by examiner

GLASS CERAMIC AND LAMINATED CERAMIC ELECTRONIC COMPONENT

CROSS REFERENCE TO RELATED APPLICATIONS

The present application is a continuation of International application No. PCT/JP2021/022434, filed Jun. 14, 2021, which claims priority to Japanese Patent Application No. 2020-104657, filed Jun. 17, 2020, Japanese Patent Application No. 2020-104658, filed Jun. 17, 2020, Japanese Patent Application No. 2020-192650, filed Nov. 19, 2020, and Japanese Patent Application No. 2020-192651, filed Nov. 19, 2020, the entire contents of each of which are incorporated herein by reference.

FIELD OF THE INVENTION

The present invention relates to glass ceramics and multilayer ceramic electronic components.

BACKGROUND OF THE INVENTION

Known ceramic materials for ceramic multilayer circuit boards include low temperature fireable glass ceramic materials.

For example, Patent Literature 1 discloses a glass composition for low temperature fired substrates, having a basic composition of $RO$—$Al_2O_3$—$B_2O_3$—$SiO_2$, wherein RO is one or two or more of MgO, CaO, SrO, BaO, and ZnO, RO and $Al_2O_3$ are each within a range of 1 to 25 mol %, and the mol % ratio $SiO_2/B_2O_3$ is 1.3 or lower; and a glass ceramic containing the glass composition for low temperature fired substrates containing an aggregate.

Patent Literature 1: JP 2004-26529 A

SUMMARY OF THE INVENTION

The glass ceramic disclosed in Patent Literature 1 can achieve an excellent dielectric loss of $20 \times 10^{-4}$ or lower at 3 GHz.

However, the glass composition for low temperature fired substrates disclosed in Patent Literature 1 has a $SiO_2/B_2O_3$ mol % ratio of 1.3 or lower, i.e., a high boron (B) content. Such a boron-rich glass composition can lead to a low dielectric loss, but causes an unstable boron content. Specifically, boron may be dissolved into a solvent during mixing grinding or may be evaporated during firing. If the boron content is reduced as a result of dissolution or evaporation, the viscosity of the glass may be low during firing, causing insufficient sintering. Glass with a reduced boron content due to dissolution or evaporation is chemically unstable and have poor resistance to moisture and to plating solutions, potentially causing poor quality.

The glass ceramic disclosed in Patent Literature 1 exhibits a temperature-dependent change of permittivity as high as 100 ppm/K or higher and thus is difficult to apply to electronic devices such as filters.

Further, the coefficient of thermal expansion of this glass ceramic is as low as lower than 6 ppm/K and is greatly different from the coefficient of thermal expansion of other dielectrics and a substrate, which may easily cause poor quality.

The present invention is made to solve the above issues and aims to provide a glass ceramic having a low boron content, a low permittivity, a low dielectric loss, a small temperature dependence of permittivity, and a high coefficient of thermal expansion.

In an embodiment, the glass ceramic of the present invention contains a glass containing: $SiO_2$ at a content of 20% by weight to 55% by weight, $B_2O_3$ at a content of 15% by weight to 30% by weight, $Al_2O_3$, and ZnO, wherein a weight ratio of the $SiO_2$ to the $B_2O_3$ ($SiO_2/B_2O_3$) is 1.21 or higher, and a weight ratio of the $Al_2O_3$ to the ZnO ($Al_2O_3/ZnO$) is 0.8 to 1.3, and a $TiO_2$ content, a $ZrO_2$ content, a $SnO_2$ content, and a SrO content in the glass each being 0% by weight to 5% by weight; and aggregates including 20% by weight to 50% by weight of $SiO_2$, 1% by weight to 10% by weight of $TiO_2$, 3% by weight or less of $ZrO_2$, and 1% by weight or less of ZnO relative to the weight of the glass ceramic.

In another embodiment, the glass ceramic of the present invention contains: $SiO_2$ at a content of 41.70% by weight to 67.48% by weight, $B_2O_3$ at a content of 8.74% by weight to 19.50% by weight, $Al_2O_3$ at a content of 4.875% by weight to 21.125% by weight, ZnO at a content of 5.175% by weight to 21.425% by weight, $TiO_2$ at a content of 1% by weight to 13.5% by weight, $ZrO_2$ at a content of 6.8% by weight or less, $SnO_2$ at a content of 3.95% by weight or less, and SrO at a content of 3.95% by weight or less.

The multilayer ceramic electronic component of the present invention includes a glass ceramic layer which is a sintered article of the glass ceramic of the present invention.

The present invention can provide a glass ceramic having a low boron content, a low permittivity, a low dielectric loss, a small temperature dependence of permittivity, and a high coefficient of thermal expansion.

DETAILED DESCRIPTION OF THE PREFERRED EMBODIMENTS

Figure 1:
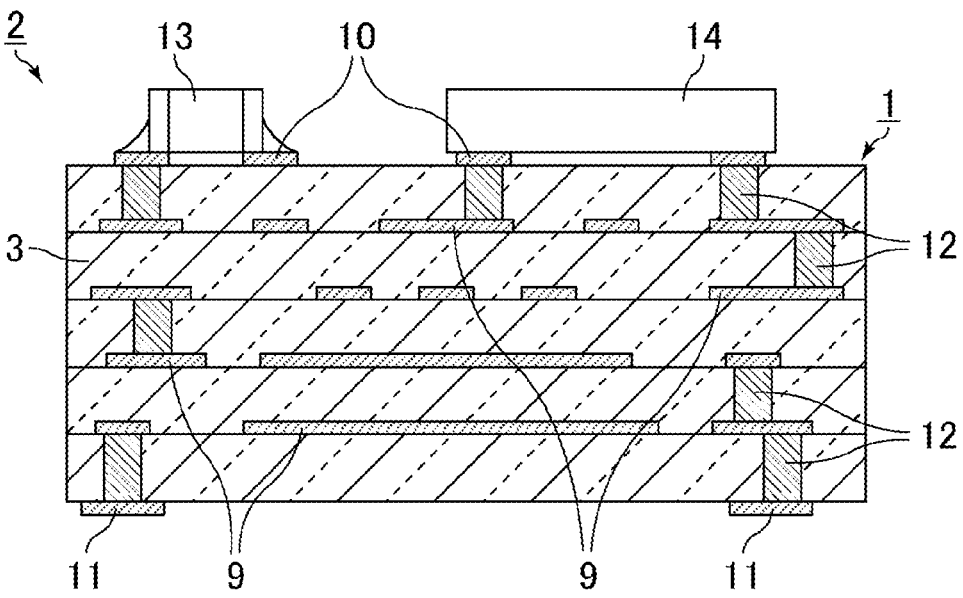
FIG. 1 is a schematic cross-sectional view of an example of the multilayer ceramic electronic component of the present invention.

The glass ceramic and multilayer ceramic electronic component of the present invention are described hereinbelow. The present invention is not limited to the following structures and may be suitably modified without departing from the gist of the present invention. Combinations of two or more preferred structures described in the following are also within the scope of the present invention.

The glass ceramic of the present invention is a low temperature co-fired ceramic (LTCC) material. The "low temperature co-fired ceramic material" herein means a glass ceramic material sinterable at a firing temperature of 1000° C. or lower.

In an embodiment, the glass ceramic of the present invention contains a glass containing: $SiO_2$ at a content of 20% by weight to 55% by weight, $B_2O_3$ at a content of 15% by weight to 30% by weight, $Al_2O_3$, and ZnO, wherein a weight ratio of the $SiO_2$ to the $B_2O_3$ ($SiO_2/B_2O_3$) is 1.21 or higher, and a weight ratio of the $Al_2O_3$ to the ZnO ($Al_2O_3/ZnO$) is 0.8 to 1.3, and a $TiO_2$ content, a $ZrO_2$ content, a $SnO_2$ content, and a SrO content in the glass each being 0% by weight to 5% by weight; and aggregates including 20% by weight to 50% by weight of $SiO_2$, 1% by weight to 10% by weight of $TiO_2$, 3% by weight or less of $ZrO_2$, and 1% by weight or less of ZnO each relative to the weight of the glass ceramic.

In the glass ceramic of the present invention, the glass contains 20% by weight to 55% by weight of $SiO_2$.

The glass having a $SiO_2$ content of 20% by weight to 55% by weight contributes to a low permittivity of a sintered glass ceramic. This resultantly leads to, for example, reduction in the stray capacity due to electrical signals with higher frequencies.

A $SiO_2$ content of higher than 55% by weight causes issues such as difficulty in sintering at 1000° C. or lower and less precipitation of $ZnAl_2O_4$ crystals. In contrast, since the $SiO_2$ content is 55% by weight or less in the present invention, these issues do not occur.

A $SiO_2$ content of lower than 20% by weight causes too low a viscosity to achieve vitrification.

$B_2O_3$ in the glass contributes to a low viscosity of the glass and thus allows a sintered article of the glass ceramic to be dense.

The glass defining the glass ceramic of the present invention has a $B_2O_3$ content of 15% by weight to 30% by weight and a weight ratio of $SiO_2$ to $B_2O_3$ ($SiO_2/B_2O_3$) of 1.21 or higher, which means that the proportion of $B_2O_3$ in the whole glass is small. This therefore less easily causes release of boron from the glass due to dissolution or evaporation and eventually less easily causes issues such as insufficient sintering and poor resistance to plating solutions.

The weight ratio of $SiO_2$ to $B_2O_3$ ($SiO_2/B_2O_3$) is preferably 1.21 to 3.67. A weight ratio of $SiO_2$ to $B_2O_3$ ($SiO_2/B_2O_3$) within this range less easily causes release of boron from the glass due to dissolution or evaporation.

A weight ratio of $SiO_2$ to $B_2O_3$ ($SiO_2/B_2O_3$) of lower than 1.21 means too much $B_2O_3$ relative to $SiO_2$, which easily causes dissolution or evaporation of boron.

$Al_2O_3$ in the glass contributes to improved chemical stability of the glass.

Zn in the glass forms $ZnAl_2O_4$ together with Al.

Al and Zn contained in the glass precipitate in the form of $ZnAl_2O_4$ crystals, which contribute to a low loss, in the glass.

A weight ratio of $Al_2O_3$ to ZnO ($Al_2O_3/ZnO$) of 0.8 to 1.3 allows the glass to have a $ZnAl_2O_4$ content within a preferred range.

A weight ratio of $Al_2O_3$ to ZnO ($Al_2O_3/ZnO$) of lower than 0.8 means too much ZnO and causes a low Q value, which is the reciprocal of the dielectric loss. In contrast, a weight ratio of $Al_2O_3$ to ZnO ($Al_2O_3/ZnO$) of higher than 1.3 means too much $Al_2O_3$ and causes a high viscosity of the glass, resulting in a failure in providing a dense sintered article.

The glass in the glass ceramic of the present invention may further contain a sub-component.

The sub-component preferably includes at least one metal selected from the group consisting of an alkali metal, an alkaline-earth metal, and a different metal from that of a main-component of the glass.

The alkali metal preferably includes at least one selected from the group consisting of Li, Na, and K.

The alkaline-earth metal preferably includes at least one selected from the group consisting of Be, Mg, Ca, Sr, and Ba.

The different metal preferably includes at least one selected from the group consisting of Ti, Zr, and Sn.

The sum of the amounts of the sub-components is preferably 0.1% by weight to 5% by weight of the weight of the whole glass. A predetermined amount of the sub-components can promote crystallization of the glass and contribute to a low dielectric loss.

The glass may contain at least one oxide selected from the group consisting of $TiO_2$, $ZrO_2$, $SnO_2$, and SrO. The $TiO_2$ content, the $ZrO_2$ content, the $SnO_2$ content, and the SrO content in the glass are each 0% by weight to 5% by weight.

These conditions allow the glass ceramic to have an improved Q value and a small temperature dependence of permittivity.

A Ti content of more than 5% by weight in terms of oxide in the glass may cause too high a relative permittivity.

A Zr content of more than 5% by weight in terms of oxide in the glass may cause too high a relative permittivity.

A Sn content of more than 5% by weight in terms of oxide in the glass may cause too low a Q value.

A Sr content of more than 5% by weight in terms of oxide in the glass may cause too low a Q value.

The glass ceramic of the present invention contains 20% by weight to 50% by weight of $SiO_2$ as an aggregate.

$SiO_2$ as an aggregate is preferably quartz.

Quartz can contribute to a high coefficient of thermal expansion of a sintered glass ceramic. The coefficient of thermal expansion of the glass is about 6 ppm/K, while the coefficient of thermal expansion of the quartz is about 15 ppm/K. Thus, the presence of quartz in the glass ceramic may lead to a high coefficient of thermal expansion after sintering. This may generate a compression stress in the course of cooling after sintering, resulting in a high mechanical strength (e.g., flexural strength), as well as high reliability in mounting the product on a mounting board (e.g., a resin board).

Quartz as an aggregate in an amount of 20% by weight to 50% by weight can lead to a high coefficient of thermal expansion of the glass ceramic close to the coefficient of thermal expansion of conductive layers formed from a metal such as copper or silver. Less than 20% by weight of quartz as an aggregate may cause too low a coefficient of thermal expansion. More than 50% by weight of quartz as an aggregate may cause too high a coefficient of thermal expansion.

The glass ceramic of the present invention contains 1% by weight to 10% by weight of $TiO_2$ as an aggregate. $TiO_2$ as an aggregate has a high temperature coefficient of relative permittivity (TCC) with the minus sign. In contrast, $SiO_2$ has a high TCC with the plus sign. Thus, 1% by weight to 10% by weight of $TiO_2$ as an aggregate enables control of the temperature dependence of relative permittivity to about 60 ppm/K.

Less than 1% by weight, or more than 10% by weight of $TiO_2$ as an aggregate may cause a failure in controlling the TCC to a predetermined value.

The glass ceramic of the present invention contains 3% by weight or less of $ZrO_2$ as an aggregate.

Thus, 3% by weight or less of $ZrO_2$ as an aggregate relative to the weight of the glass ceramic can lead to a low dielectric loss.

More than 3% by weight of $ZrO_2$ as an aggregate may cause too high a relative permittivity.

The amount of $ZrO_2$ as an aggregate is 0% by weight or more, preferably 0.1% by weight or more, more preferably 1% by weight or more of the weight of the glass ceramic.

The glass ceramic of the present invention contains 1% by weight or less of ZnO as an aggregate.

Thus, 1% by weight or less of ZnO as an aggregate relative to the weight of the glass ceramic can lead to improved sinterability and can compensate for volatile ZnO components in the glass.

More than 1% by weight of ZnO as an aggregate may cause poor resistance to moisture.

The amount of ZnO as an aggregate is 0% by weight or more, preferably 0.1% by weight or more of the weight of the glass ceramic.

For the glass ceramic of the present invention, the glass and the aggregates can be distinguished or separated by, for example, a method of analyzing the electron diffraction pattern using a scanning electron microscope (SEM) or a transmission electron microscope (TEM), or a method of melting the glass portion with hydrogen fluoride.

The distinguished or separated glass and aggregates are subjected to elemental analysis such as wavelength-dispersive X-ray spectroscopy (WDX), energy-dispersive X-ray spectroscopy (EDX), or inductively coupled plasma (ICP) optical emission spectroscopy. Thereby, the compositions of the glass and the aggregates can be determined. Any of the above methods can determine both the $SiO_2$ content in the glass and the $SiO_2$ content as an aggregate. The same applies to the other elements.

In another embodiment, the glass ceramic of the present invention contains Si, B, Al, Zn, and Ti, the glass having a $SiO_2$ content of 41.70% by weight to 67.48% by weight, a $B_2O_3$ content of 8.74% by weight to 19.50% by weight, an $Al_2O_3$ content of 4.875% by weight to 21.125% by weight, a ZnO content of 5.175% by weight to 21.425% by weight, a $TiO_2$ content of 1% by weight to 13.5% by weight, a $ZrO_2$ content of 6.8% by weight or less, a $SnO_2$ content of 3.95% by weight or less, and a SrO content of 3.95% by weight or less.

This different embodiment of the glass ceramic of the present invention corresponds to an embodiment of the present invention in which the amounts of Si, B, Al, Zn, Ti, Zr, Sn, and Sr are specified without distinguishing the glass and the aggregates. Thus, this different embodiment of the glass ceramic of the present invention is substantially the same as an embodiment of the glass ceramic of the present invention and exhibits the same effects.

<Multilayer Ceramic Electronic Component>

The multilayer ceramic electronic component of the present invention includes multiple glass ceramic layers each of which is a sintered article of the glass ceramic of the present invention.

Examples of the multilayer ceramic electronic component of the present invention include a laminate including multiple glass ceramic layers each of which is a sintered article of the glass ceramic of the present invention and an electronic component including a multilayer ceramic substrate composed of the laminate and a chip component mounted on the ceramic substrate.

The multilayer ceramic electronic component of the present invention includes multiple glass ceramic layers each of which is a sintered article of the glass ceramic of the present invention, and thus has a low permittivity and a low dielectric loss.

The laminate including multiple glass ceramic layers each of which is a sintered article of the glass ceramic of the present invention may be used for a ceramic multilayer substrate for communication or a multilayer dielectric filter, for example.

Each glass ceramic layer preferably has a coefficient of thermal expansion of 6 ppm/K or higher.

Each glass ceramic layer preferably has a relative permittivity of 6 or lower.

Each glass ceramic layer preferably has a Q value of 500 or higher.

Each glass ceramic layer preferably has a temperature characteristic of relative permittivity (TCC) of −100 ppm/K to +100 ppm/K.

FIG. 1 is a schematic cross-sectional view of an example of a multilayer ceramic electronic component of the present invention. As illustrated in FIG. 1, an electronic component 2 includes a laminate 1 including a stack of multiple (five in FIG. 1) glass ceramic layers 3 and chip components 13 and 14 mounted on the laminate 1. The laminate 1 is also a multilayer ceramic substrate.

Each of the glass ceramic layers 3 is a sintered article of the glass ceramic of the present invention. Thus, the laminate 1 including the stack of multiple glass ceramic layers 3 and the electronic component 2 including a multilayer ceramic substrate that includes the laminate 1 and the chip components 13 and 14 mounted on the multilayer ceramic substrate (laminate 1) are each the multilayer ceramic electronic component of the present invention. The compositions of the multiple glass ceramic layers 3 may be the same as or different from each other, and are preferably the same as each other.

The laminate 1 may further include a conductive layer. For example, the conductive layer defines a passive element such as a capacitor or an inductor or defines a connection line that provides an electrical connection between elements. Examples of the conductive layer include conductive layers 9, 10, and 11 as well as via hole conductive layers 12, as illustrated in FIG. 1.

The conductive layers 9, 10, and 11 as well as the via hole conductive layers 12 preferably contain Ag or Cu as a main component. Use of such a low-resistance metal can prevent occurrence of signal propagation delay due to electrical signals with higher frequencies. The constituent material of each glass ceramic layer 3 used is the glass ceramic of the present invention, and thus can be co-fired with Ag or Cu.

The conductive layers 9 are provided inside the laminate 1. Specifically, the conductive layers 9 are provided at interfaces of glass ceramic layers 3.

The conductive layers 10 are provided on one main surface of the laminate 1.

The conductive layers 11 are provided on the other main surface of the laminate 1.

The via hole conductive layers 12 are each provided to penetrate a glass ceramic layer 3 and play a role of electrically connecting conductive layers 9 of different levels, electrically connecting conductive layers 9 and 10, or electrically connecting conductive layers 9 and 11.

The laminate 1 may be produced as follows, for example.

(A) Preparation of Glass $SiO_2$, $B_2O_3$, $Al_2O_3$, and ZnO as well as a sub-component to be optionally added are mixed such that the $SiO_2$ content is 20% by weight to 55% by weight, the $B_2O_3$ content is 15% by weight to 30% by weight, the weight ratio of $SiO_2$ to $B_2O_3$ ($SiO_2/B_2O_3$) is 1.21 or higher, the weight ratio of $Al_2O_3$ to ZnO ($Al_2O_3$/ZnO) is 0.8 to 1.3, and the amounts of $TiO_2$, $ZrO_2$, $SnO_2$, and SrO are each 0% by weight to 5% by weight. Thereby, a glass is prepared.

(B) Preparation of Glass Ceramic

The glass is mixed with $SiO_2$, $TiO_2$, $ZrO_2$, and ZnO as aggregates, whereby the glass ceramic of the present invention is prepared.

(C) Production of Green Sheet

The glass ceramic of the present invention is mixed with components such as a binder and a plasticizer, whereby ceramic slurry is prepared. The ceramic slurry is then applied in a pattern to a base film (e.g., a polyethylene terephthalate (PET) film) and dried, whereby a green sheet is produced.

(D) Production of Multilayer Green Sheet

Figure 2:
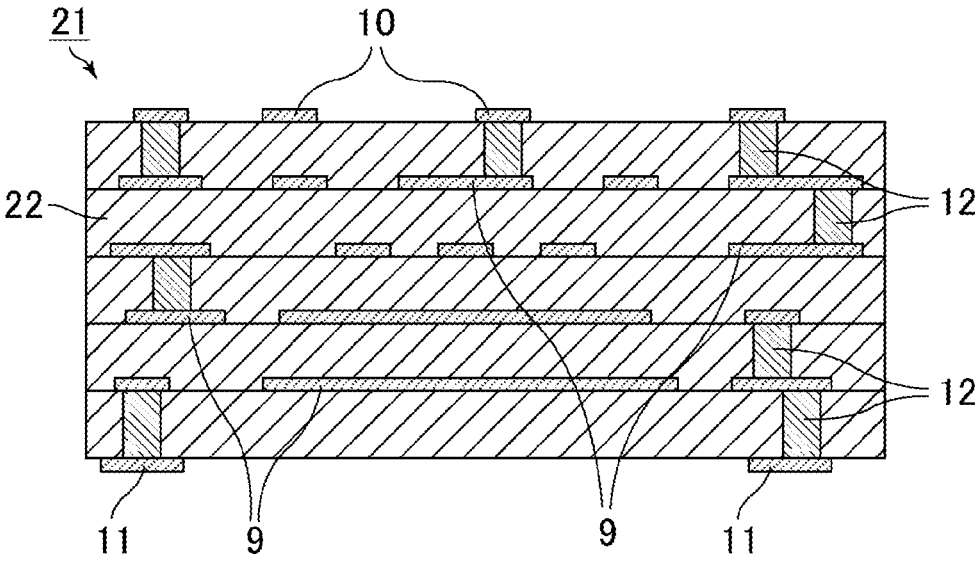
FIG. 2 is a schematic cross-sectional view of a multilayer green sheet (non-fired) produced in the course of producing the multilayer ceramic electronic component illustrated in FIG. 1.

Multiple green sheets are stacked, whereby a multilayer green sheet (non-fired) is produced. FIG. 2 is a schematic cross-sectional view of the multilayer green sheet (non-fired) produced in the course of production of the multilayer ceramic electronic component illustrated in FIG. 1. As illustrated in FIG. 2, a multilayer green sheet 21 includes a stack of multiple (five in FIG. 2) green sheets 22. The green sheets 22 are to be the glass ceramic layers 3 after firing. The multilayer green sheet 21 may be provided with conductive layers including the conductive layers 9, 10, and 11 as well as the via hole conductive layers 12. The conductive layers may be formed by a technique such as screen printing or photolithography using a conductive paste containing Ag or Cu.

(E) Firing of Multilayer Green Sheet

The multilayer green sheet 21 is fired. As a result, the multilayer ceramic substrate 1 as illustrated in FIG. 1 is obtained.

The firing temperature for the multilayer green sheet 21 may be any temperature at which the glass ceramic of the present invention defining the green sheets 22 can be sintered, and may be 1000° C. or lower.

The firing atmosphere for the multilayer green sheet 21 may be any atmosphere, and is preferably the air atmosphere in the case where an oxidation-resistive material such as Ag is used for the conductive layers 9, 10, and 11 and the via hole conductive layers 12, or preferably an oxygen-poor atmosphere such as a nitrogen atmosphere in the case where an easily oxidative material such as Cu is used therefor. The firing atmosphere for the multilayer green sheet 21 may be a reduced atmosphere.

The multilayer green sheet 21 may be fired while sandwiched between restraining green sheets. The restraining green sheets each contain as a main component an inorganic material (e.g., $Al_2O_3$) that is substantially unsinterable at the sintering temperature for the glass ceramic of the present invention defining the green sheets 22. Thus, the restraining green sheets do not shrink during firing of the multilayer green sheet 21 but act to reduce shrinkage of the multilayer green sheet 21 in the main surface direction. They can resultantly lead to improved dimensional accuracy of the resulting laminate 1 (particularly the conductive layers 9, 10, and 11 as well as the via hole conductive layers 12).

The laminate 1 may be provided with the chip components 13 and 14 each electrically connected with a conductive layer 10. Thereby, the electronic component 2 including the laminate 1 is fabricated.

Examples of the chip components 13 and 14 include an LC filter, a capacitor, and an inductor.

The electronic component 2 may be mounted on a board (e.g., motherboard) so as to be electrically connected therewith via the conductive layers 11.

EXAMPLES

The following provides examples that more specifically disclose the glass ceramic and multilayer ceramic electronic component of the present invention. The present invention is not limited to these examples.

(A) Preparation of Glass

Glasses G1 to G25 (each in the form of powder) having the respective compositions shown in Table 1 were prepared by the following method. First, glass material powders were mixed and put into a Pt-Rh crucible, and then melted at 1650° C. for six hours or longer in the air atmosphere. The resulting melt was rapidly cooled, whereby cullet was produced. The cullet was coarsely pulverized and put into a container together with an organic solvent and PSZ balls (diameter: 5 mm). The contents were then mixed using a ball mill. The pulverization duration in the mixing with the ball mill was adjusted so that a glass powder having a central particle size of 1.5 μm was obtained. The "central particle size" herein means the central particle size $D_{50}$ measured by laser diffraction-scattering analysis.

The glasses G6 to G9, G12, G13, G19, G21, G23, and G25 with the mark * in Table 1 are not encompassed by the glass defining the glass ceramic of the present invention.

TABLE 1

| Glass No. | SiO2 [wt %] | B2O3 [wt %] | Al2O3 [wt %] | ZnO [wt %] | TiO2 [wt %] | ZrO2 [wt %] | SnO2 [wt %] | SrO [wt %] | SiO2/B2O3 weight ratio | Al2O3/ZnO weight ratio |
|---|---|---|---|---|---|---|---|---|---|---|
| G1 | 40.0 | 20.0 | 20.0 | 20.0 | — | — | — | — | 2.00 | 1.0 |
| G2 | 55.0 | 15.0 | 15.0 | 15.0 | — | — | — | — | 3.67 | 1.0 |
| G3 | 55.0 | 30.0 | 7.5 | 7.5 | — | — | — | — | 1.83 | 1.0 |
| G4 | 36.3 | 30.0 | 16.9 | 16.8 | — | — | — | — | 1.21 | 1.0 |
| G5 | 20.0 | 15.0 | 32.5 | 32.5 | — | — | — | — | 1.33 | 1.0 |
| G6* | 60.0 | 20.0 | 10.0 | 10.0 | — | — | — | — | 3.00 | 1.0 |
| G7* | 40.0 | 40.0 | 10.0 | 10.0 | — | — | — | — | 1.00 | 1.0 |
| G8* | 10.0 | 30.0 | 30.0 | 30.0 | — | — | — | — | 0.33 | 1.0 |
| G9* | 30.0 | 10.0 | 30.0 | 30.0 | — | — | — | — | 3.00 | 1.0 |
| G10 | 40.0 | 19.8 | 17.8 | 22.4 | — | — | — | — | 2.02 | 0.8 |
| G11 | 40.0 | 20.0 | 22.6 | 17.4 | — | — | — | — | 2.00 | 1.3 |
| G12* | 40.0 | 20.0 | 15.0 | 25.0 | — | — | — | — | 2.00 | 0.6 |
| G13* | 40.0 | 20.0 | 25.0 | 15.0 | — | — | — | — | 2.00 | 1.7 |
| G14 | 39.0 | 20.0 | 20.0 | 20.0 | 1.0 | — | — | — | 1.95 | 1.0 |
| G15 | 39.0 | 20.0 | 20.0 | 20.0 | — | 1.0 | — | — | 1.95 | 1.0 |
| G16 | 39.0 | 20.0 | 20.0 | 20.0 | — | — | 1.0 | — | 1.95 | 1.0 |
| G17 | 38.0 | 19.0 | 20.0 | 20.0 | — | — | — | 3.0 | 2.00 | 1.0 |
| G18 | 37.0 | 18.0 | 20.0 | 20.0 | 5.0 | — | — | — | 2.06 | 1.0 |
| G19* | 36.0 | 17.0 | 20.0 | 20.0 | 7.0 | — | — | — | 2.12 | 1.0 |
| G20 | 37.0 | 18.0 | 20.0 | 20.0 | — | 5.0 | — | — | 2.06 | 1.0 |
| G21* | 36.0 | 17.0 | 20.0 | 20.0 | — | 7.0 | — | — | 2.12 | 1.0 |

TABLE 1-continued

| Glass No. | SiO$_2$ [wt %] | B$_2$O$_3$ [wt %] | Al$_2$O$_3$ [wt %] | ZnO [wt %] | TiO$_2$ [wt %] | ZrO$_2$ [wt %] | SnO$_2$ [wt %] | SrO [wt %] | SiO$_2$/B$_2$O$_3$ weight ratio | Al$_2$O$_3$/ZnO weight ratio |
|---|---|---|---|---|---|---|---|---|---|---|
| G22 | 37.0 | 18.0 | 20.0 | 20.0 | — | — | 5.0 | — | 2.06 | 1.0 |
| G23* | 36.0 | 17.0 | 20.0 | 20.0 | — | — | 7.0 | — | 2.12 | 1.0 |
| G24 | 37.0 | 18.0 | 20.0 | 20.0 | — | — | — | 5.0 | 2.06 | 1.0 |
| G25* | 36.0 | 17.0 | 20.0 | 20.0 | — | — | — | 7.0 | 2.12 | 1.0 |

The glass G6 has a SiO$_2$ content of higher than 55% by weight.

The glass G7 has a B$_2$O$_3$ content of higher than 30% by weight.

The glass G8 has a weight ratio of SiO$_2$ to B$_2$O$_3$ (SiO$_2$/B$_2$O$_3$) of lower than 1.21.

The glass G9 has a B$_2$O$_3$ content of lower than 15% by weight.

The glass G12 has a weight ratio of Al$_2$O$_3$ to ZnO (Al$_2$O$_3$/ZnO) of lower than 0.8.

The glass G13 has a weight ratio of Al$_2$O$_3$ to ZnO (Al$_2$O$_3$/ZnO) of higher than 1.3.

The glass G19 has a TiO$_2$ content of higher than 5% by weight.

The glass G21 has a ZrO$_2$ content of higher than 5% by weight.

The glass G23 has a SnO$_2$ content of higher than 5% by weight.

The glass G25 has a SrO content of higher than 5% by weight.

(B) Preparation of Glass Ceramic

Next, based on each composition shown in Table 2, the glass and aggregates were put into ethanol and mixed using a ball mill. Thereby, a glass ceramic was prepared. SiO$_2$ among the aggregates is quartz having a central particle size of 1 μm.

(C) Production of Green Sheet

One of the glass ceramics and additives were put into a solvent mixture of toluene and ethanol and mixed using a ball mill. The mixture is then combined with a binder solution of polyvinyl butyral dissolved in ethanol and a dioctyl phthalate (DOP) solution serving as a plasticizer, whereby ceramic slurry was prepared. The ceramic slurry was then applied in a pattern to a polyethylene terephthalate film using a doctor blade and dried at 40° C. Thereby, one of 25-μm-thick green sheets S1 to S38 was produced.

(D) Production of Multilayer Green Sheet

Each of the green sheets S1 to S38 was cut to provide 78 mm×58 mm rectangles and 30 pieces thereof were stacked. The stack was put into a mold and compressed using a press, and then cut off at its side portions so as to have a 50-mm-square dimensions in a plan view. Thereby, respective multilayer green sheets were produced.

(E) Firing of Multilayer Green Sheet

The multilayer green sheets were fired at 980° C. for 60 minutes in a reduced atmosphere. The resulting fired articles were laminates L1 to L38 each including multiple glass ceramic layers each of which is a sintered article of the glass ceramic. The laminates L6, L7, L8, L9, L12, L13, L22, L23, L25, L27, L28, L30, L32, L34, L36, and L38 with the mark * in Table 2 are not encompassed by the laminate including the glass ceramic of the present invention.

<Measurement of Relative Permittivity and Dielectric Loss>

For each of the resulting laminates L1 to L38, the thickness was measured and the relative permittivity and dielectric loss under 6 GHz conditions were measured by the perturbation method. The reciprocal of the measured dielectric loss was taken as the Q value. The results are shown in Table 2.

A relative permittivity of 6 or lower was evaluated as good. A Q value of 500 or higher was evaluated as good.

<Measurement Devices and Measurement Conditions>

Network analyzer: 8757D available from Keysight Technologies

Signal generator: 83751 synthesized sweeper available from Keysight Technologies Resonator: self-made jig (resonance frequency: 6 GHz)

Before the measurement, the network analyzer and the signal generator were connected and the cable loss was measured. The resonator was calibrated using a reference substrate (quartz, permittivity: 3.73, Q value: 4545 at 6 GHz, thickness: 0.636 mm).

<Measurement of Coefficient of Thermal Expansion α>

For each of the resulting laminates L1 to L38, the coefficient of thermal expansion a was determined within a temperature range from room temperature to 600° C. using a Dilatometer TD5000SE (available from Netzsch Japan K.K.). The results are shown in Table 2. A coefficient of thermal expansion a of 6 ppm/K or higher indicates a sufficiently high coefficient of thermal expansion.

<Moisture Resistance Test>

The moisture resistance was tested as follows.

A copper-containing conductive paste was printed on the surface of each of the green sheets S1 to S38, whereby green sheets each having a pattern to be an internal electrode printed thereon were prepared. For each of these green sheets, multiple sheets were stacked so that a laminate was produced and this laminate was fired. Thereby, respective multilayer capacitors C1 to C38 having an element thickness of 10 μm were produced. For each of the resulting multilayer capacitors C1 to C38, a pressure cooker bias test (PCBT test) was performed under the following conditions. Those having an insulation resistance of 10$^{10}$Ω or higher after 196 hours were evaluated as having sufficient resistance to moisture. Those having insufficient moisture resistance were indicated in the note of Table 2.

Temperature: 121° C.

Pressure: 2 atm

Humidity: 95% RH

Voltage: 10 V (DC)

<Measurement of Temperature Characteristic of Relative Permittivity (TCC)>

For each of the multilayer capacitors C1 to C38, the temperature-dependent change of capacitance at 1 MHz was measured using an LCR meter (4284A available from Keysight Technologies). The results are shown in Table 2. A TCC value of −100 ppm/K to +100 ppm/K were evaluated as good TCC characteristic.

The multilayer capacitors C1 to C38 obtained by stacking multiple pieces of the respective green sheets S1 to S38 having a pattern to be an internal electrode printed thereon are technically different from the laminates L1 to L38. Still, for convenience, the TCC characteristic is shown as a characteristic of the laminates L1 to L38 in Table 2.

TABLE 2

| Laminate No. | No. | Glass Amount [wt %] | Aggregates SiO$_2$ [wt %] | TiO$_2$ [wt %] | ZnO [wt %] | ZrO$_2$ [wt %] | Relative permittivity | Q value [at 6 GHz] | TCC [ppm/K] | α [ppm/K] | Note |
|---|---|---|---|---|---|---|---|---|---|---|---|
| L1 | G1 | 65.0 | 28.7 | 5.0 | 0.3 | 1.0 | 5.1 | 1000 | 55 | 9.0 | |
| L2 | G2 | 65.0 | 28.7 | 5.0 | 0.3 | 1.0 | 5.0 | 500 | 60 | 8.0 | |
| L3 | G3 | 65.0 | 28.7 | 5.0 | 0.3 | 1.0 | 4.9 | 700 | 65 | 8.2 | |
| L4 | G4 | 65.0 | 28.7 | 5.0 | 0.3 | 1.0 | 5.4 | 900 | 65 | 8.0 | |
| L5 | G5 | 65.0 | 28.7 | 5.0 | 0.3 | 1.0 | 5.8 | 500 | 70 | 8.5 | |
| L6* | G6* | 65.0 | 28.7 | 5.0 | 0.3 | 1.0 | — | — | — | — | Unsintered |
| L7* | G7* | 65.0 | 28.7 | 5.0 | 0.3 | 1.0 | 5.0 | 1200 | 55 | 7.8 | No moisture resistance |
| L8* | G8* | 65.0 | 28.7 | 5.0 | 0.3 | 1.0 | 4.8 | 600 | 80 | 8.0 | No moisture resistance |
| L9* | G9* | 65.0 | 28.7 | 5.0 | 0.3 | 1.0 | — | — | — | — | Unsintered |
| L10 | G10 | 65.0 | 28.7 | 5.0 | 0.3 | 1.0 | 4.8 | 700 | 57 | 8.8 | |
| L11 | G11 | 65.0 | 28.7 | 5.0 | 0.3 | 1.0 | 4.9 | 600 | 70 | 8.9 | |
| L12* | G12* | 65.0 | 28.7 | 5.0 | 0.3 | 1.0 | 4.7 | 450 | 77 | 9.0 | Low Q value |
| L13* | G13* | 65.0 | 28.7 | 5.0 | 0.3 | 1.0 | 4.8 | 470 | 79 | 8.8 | Low Q value |
| L14 | G14 | 65.0 | 28.7 | 5.0 | 0.3 | 1.0 | 5.2 | 1200 | 60 | 9.1 | |
| L15 | G15 | 65.0 | 28.7 | 5.0 | 0.3 | 1.0 | 5.3 | 1200 | 54 | 8.9 | |
| L16 | G16 | 65.0 | 28.7 | 5.0 | 0.3 | 1.0 | 5.0 | 1100 | 70 | 9.3 | |
| L17 | G17 | 65.0 | 28.7 | 5.0 | 0.3 | 1.0 | 5.2 | 700 | 55 | 8.9 | |
| L18 | G1 | 43.7 | 50.0 | 5.0 | 0.3 | 1.0 | 4.7 | 600 | 70 | 7.0 | |
| L19 | G1 | 73.7 | 20.0 | 5.0 | 0.3 | 1.0 | 5.5 | 1000 | 80 | 6.1 | |
| L20 | G1 | 65.0 | 28.7 | 5.0 | 0.3 | 1.0 | 4.2 | 1200 | 100 | 8.0 | |
| L21 | G1 | 60.0 | 28.7 | 10.0 | 0.3 | 1.0 | 6.0 | 800 | 0 | 9.2 | |
| L22* | G1 | 33.7 | 60.0 | 5.0 | 0.3 | 1.0 | — | — | — | — | Unsintered |
| L23* | G1 | 83.7 | 10.0 | 5.0 | 0.3 | 1.0 | 4.9 | 1300 | 50 | 5.8 | Low α |
| L24 | G1 | 63.0 | 28.7 | 5.0 | 0.3 | 3.0 | 5.5 | 1000 | 60 | 9.0 | |
| L25* | G1 | 61.0 | 28.7 | 5.0 | 0.3 | 5.0 | 6.1 | 900 | 70 | 9.7 | High ε |
| L26 | G1 | 64.3 | 28.7 | 5.0 | 1.0 | 1.0 | 5.1 | 1100 | 55 | 8.9 | |
| L27* | G1 | 63.3 | 28.7 | 5.0 | 2.0 | 1.0 | 5.2 | 1200 | 57 | 9.1 | No moisture resistance |
| L28* | G1 | 60.0 | 28.7 | 15.0 | 0.3 | 1.0 | 6.9 | 600 | −110 | 8.8 | Low TCC |
| L29 | G1 | 65.0 | 32.7 | 1.0 | 0.3 | 1.0 | 4.4 | 1100 | 95 | 8.8 | |
| L30* | G1 | 65.0 | 33.7 | 0.0 | 0.3 | 1.0 | 4.3 | 1200 | 105 | 8.7 | High TCC |
| L31 | G18 | 65.0 | 28.7 | 5.0 | 0.3 | 1.0 | 5.8 | 1300 | 65 | 9.1 | |
| L32* | G19* | 65.0 | 28.7 | 5.0 | 0.3 | 1.0 | 6.1 | 1400 | 70 | 9.2 | High ε |
| L33 | G20 | 65.0 | 28.7 | 5.0 | 0.3 | 1.0 | 5.9 | 1200 | 64 | 9.1 | |
| L34* | G21* | 65.0 | 28.7 | 5.0 | 0.3 | 1.0 | 6.2 | 1300 | 69 | 9.1 | High ε |
| L35 | G22 | 65.0 | 28.7 | 5.0 | 0.3 | 1.0 | 5.2 | 700 | 70 | 9.4 | |
| L36* | G23* | 65.0 | 28.7 | 5.0 | 0.3 | 1.0 | 5.3 | 480 | 80 | 9.5 | Low Q value |
| L37 | G24 | 65.0 | 28.7 | 5.0 | 0.3 | 1.0 | 5.4 | 500 | 40 | 8.8 | |
| L38* | G25* | 65.0 | 28.7 | 5.0 | 0.3 | 1.0 | 5.6 | 450 | 30 | 8.8 | Low Q value |

The results in Table 2 demonstrate that the laminates each including the glass ceramic layers each of which is a sintered article of the glass ceramic of the present invention had a low relative permittivity, a high Q value, a small temperature dependence of relative permittivity, and a high coefficient of thermal expansion although they each were formed from a glass having a boron content of 30% by weight or less. Further, the laminates suffered no issues due to dissolution or evaporation of boron.

The laminate L6 suffered insufficient sintering. This is presumably because the glass G6 having a SiO$_2$ content of higher than 55% by weight was used, so that the sintering insufficiently progressed at 980° C.

The laminate L7 had insufficient moisture resistance. This is presumably because the glass G7 having a B$_2$O$_3$ content of higher than 30% by weight was used, so that issues such as dissolution and evaporation of boron occurred during the production.

The laminate L8 had insufficient moisture resistance. This is presumably because the glass G8 having a SiO$_2$ content of lower than 20% by weight and a weight ratio of SiO$_2$ to B$_2$O$_3$ (SiO$_2$/B$_2$O$_3$) of lower than 1.21 was used, so that the viscosity became too low to achieve vitrification or boron was released from the glass due to dissolution and evaporation and thereby densification of the glass ceramic layers did not progress.

The laminate L9 suffered insufficient sintering. This is presumably because the glass G9 having a B$_2$O$_3$ content of lower than 15% by weight was used, so that the viscosity of the glass was not sufficiently low and thereby sintering defects occurred.

The laminate L12 had a low Q value. This is presumably because the glass G12 having a weight ratio of Al$_2$O$_3$ to ZnO (Al$_2$O$_3$/ZnO) of lower than 0.8 was used, so that the Q value was low.

The laminate L13 had a low Q value. This is presumably because the glass G13 having a weight ratio of Al$_2$O$_3$ to ZnO (Al$_2$O$_3$/ZnO) of higher than 1.3 was used, so that the viscosity of the glass was high and thereby a dense sintered article was not obtained.

The laminate L22 suffered insufficient sintering. This is presumably because the amount of SiO$_2$ as an aggregate was more than 50% by weight.

The laminate L23 had a low coefficient of thermal expansion a. This is presumably because the amount of SiO$_2$ as an aggregate was less than 20% by weight.

The laminate L25 had a high relative permittivity. This is presumably because the amount of ZrO$_2$ as an aggregate was more than 3% by weight.

The laminate L27 had insufficient moisture resistance. This is presumably because the amount of ZnO as an aggregate was more than 1% by weight.

The laminate L28 had an excessively low TCC value. This is presumably because the amount of $TiO_2$, which is a material having a negative TCC value, as an aggregate was too large.

The laminate L30 had an excessively high TCC value. This is presumably because no $TiO_2$, which is a material having a negative TCC value, was contained as an aggregate, so that the TCC value was high.

The laminate L32 had a high relative permittivity. This is presumably because the amount of $TiO_2$ in the glass was more than 5% by weight.

The laminate L34 had a high relative permittivity. This is presumably because the amount of $ZrO_2$ in the glass was more than 5% by weight.

The laminate L36 had a low Q value. This is presumably because the amount of $SnO_2$ in the glass was more than 5% by weight.

The laminate L38 had a low Q value. This is presumably because the amount of SrO in the glass was more than 5% by weight.

REFERENCE SIGNS LIST

1: laminate
2: electronic component
3: glass ceramic layer
9, 10, 11: conductive layer
12: via hole conductive layer
13, 14: chip component
21: multilayer green sheet
22: green sheet

The invention claimed is:

1. A glass ceramic comprising:
a glass containing:
   $SiO_2$ at a content of 20% by weight to 55% by weight;
   $B_2O_3$ at a content of 15% by weight to 30% by weight;
   $Al_2O_3$; and ZnO, wherein
   a weight ratio of the $SiO_2$ to the $B_2O_3$ ($SiO_2/B_2O_3$) is 1.21 or higher, and
   a weight ratio of the $Al_2O_3$ to the ZnO ($Al_2O_3/ZnO$) is 0.8 to 1.3, and
   a $TiO_2$ content, a $ZrO_2$ content, a $SnO_2$ content, and a SrO content in the glass each being 0% by weight to 5% by weight; and
aggregates including:
   20% by weight to 50% by weight of a $SiO_2$ aggregate,
   1% by weight to 10% by weight of a $TiO_2$ aggregate,
   3% by weight or less of a $ZrO_2$ aggregate, and
   1% by weight or less of a ZnO aggregate,
   each relative to a weight of the glass ceramic.

2. The glass ceramic according to claim 1, wherein the $SiO_2$ aggregate is quartz.

3. The glass ceramic according to claim 1, wherein the weight ratio of the $SiO_2$ to the $B_2O_3$ ($SiO_2/B_2O_3$) of the glass is 1.21 to 3.67.

4. The glass ceramic according to claim 1, wherein the glass further contains at least one metal as a sub-component, the at least one metal being selected from the group consisting of an alkali metal, an alkaline-earth metal, and a different metal from that of a main component of the glass.

5. The glass ceramic according to claim 4, wherein
   the alkali metal comprises at least one selected from the group consisting of Li, Na and K,
   the alkaline-earth metal comprises at least one selected from the group consisting of Be, Mg, Ca, Sr, and Ba, and
   the different metal comprises at least one selected from the group consisting of Ti, Zr, and Sn.

6. The glass ceramic according to claim 4, wherein a sum of an amount of the sub-component is 0.1% by weight to 5% by weight of the weight of a whole of the glass.

* * * * *